United States Patent
Sawamura et al.

(10) Patent No.: US 9,884,696 B2
(45) Date of Patent: Feb. 6, 2018

(54) FITTING DEVICE AND FITTING METHOD FOR CYLINDRICAL FILM BODY

(71) Applicant: FUJI SEAL INTERNATIONAL, INC., Osaka-shi, Osaka (JP)

(72) Inventors: Takuji Sawamura, Sakai (JP); Shigeru Hada, Sakai (JP)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 380 days.

(21) Appl. No.: 14/405,067

(22) PCT Filed: Mar. 21, 2013

(86) PCT No.: PCT/JP2013/057968
§ 371 (c)(1),
(2) Date: Dec. 2, 2014

(87) PCT Pub. No.: WO2013/183336
PCT Pub. Date: Dec. 12, 2013

(65) Prior Publication Data
US 2015/0158618 A1    Jun. 11, 2015

(30) Foreign Application Priority Data
Jun. 5, 2012    (JP) ................................ 2012-128257

(51) Int. Cl.
*B65C 3/08* (2006.01)
*B65C 9/06* (2006.01)
(Continued)

(52) U.S. Cl.
CPC ............ *B65C 3/065* (2013.01); *B65C 9/0065* (2013.01); *B65C 9/06* (2013.01); *B32B 37/0046* (2013.01);
(Continued)

(58) Field of Classification Search
None
See application file for complete search history.

(56) References Cited

U.S. PATENT DOCUMENTS 3,871,943 A * 3/1975 Zodrow .................... B65C 3/22
156/521
4,765,121 A    8/1988 Konstantin et al.
(Continued)

FOREIGN PATENT DOCUMENTS

JP    S64-9131 A    1/1989
JP    H01-139321 A    5/1989
(Continued)

OTHER PUBLICATIONS

Jul. 2, 2013 International Search Report issued in International Application No. PCT/JP2013/057968.

*Primary Examiner* — Linda L Gray
(74) *Attorney, Agent, or Firm* — Oliff PLC

(57) ABSTRACT

A label fitting device cylindrically opens and feeds downward an individual label, and thereby fits the individual film body around a fitting target carried to a fitting position. The label fitting device includes a feed unit which feeds downward the label base material while changing the carrying direction thereof, and a label fitting unit which carries downward the label and fits the label to the container. The label is formed by cutting the label base material fed by the feed unit. The label fitting unit is provided so as to be turnable relative to the container to thereby enable adjustment of the fitting angular position of the cylindrical label relative to the circumferential direction of the container.

7 Claims, 11 Drawing Sheets

(51) Int. Cl.
B32B 38/04 (2006.01)
B32B 37/28 (2006.01)
B32B 3/14 (2006.01)
B65C 3/06 (2006.01)
B65C 9/00 (2006.01)
B32B 38/00 (2006.01)
B65C 9/18 (2006.01)
B65C 9/14 (2006.01)
B32B 37/18 (2006.01)
B65C 9/26 (2006.01)
B32B 37/00 (2006.01)
B65C 9/02 (2006.01)

(52) U.S. Cl.
CPC ............ *B32B 37/182* (2013.01); *B32B 37/28* (2013.01); *B32B 38/0004* (2013.01); *B65C 9/02* (2013.01); *B65C 9/14* (2013.01); *B65C 9/18* (2013.01); *B65C 9/26* (2013.01); *Y10T 156/1062* (2015.01); *Y10T 156/12* (2015.01); *Y10T 156/1317* (2015.01); *Y10T 156/1322* (2015.01); *Y10T 156/1339* (2015.01)

(56) References Cited

U.S. PATENT DOCUMENTS

| | | | |
|---|---|---|---|
| 4,910,941 A | | 3/1990 | Nagano et al. |
| 5,398,395 A | * | 3/1995 | Woolls .................... B67B 5/036 156/521 |
| 2010/0093507 A1 | | 4/2010 | Hoeben |

FOREIGN PATENT DOCUMENTS

| | | |
|---|---|---|
| JP | H10-316116 A | 12/1998 |
| JP | 2002-308240 A | 10/2002 |
| JP | 2010-516567 A | 5/2010 |

* cited by examiner

FITTING DEVICE AND FITTING METHOD FOR CYLINDRICAL FILM BODY

TECHNICAL FIELD

The present invention relates to a fitting device and a fitting method for a cylindrical film body to be fit, to a fitting target such as a bottle container, an individual film body such as a cap seal, or a label which is manufactured by carrying a long cylindrical film base material and sequentially cutting the film base material to a predetermined length.

BACKGROUND ART

A known film fitting device which fits a cylindrical film such as a label to the body of a bottle container is disclosed in, for example, JP No. 10-316116 A (hereinafter referred to as Patent Document 1). This film fitting device fits, to a columnar mandrel, a long cylindrical film base material which is a seamless cylindrical film and which is folded into a sheet shape, and thereby opens the film base material into a predetermined state and sends the film base material to the middle part of the mandrel by means of a moving unit. The film fitting device sequentially cuts the film base material to a predetermined cut length by a cutting unit disposed above the mandrel to form an individual cylindrical film. The film fitting device feeds the opened individual cylindrical film by a shot roller provided at the lower end of the mandrel, thereby fitting the individual cylindrical film to the body of each of bottle containers sequentially carried to a film fitting position.

CITATION LIST

Patent Literature

Patent Document 1: JP 10-316116 A

SUMMARY OF INVENTION

Technical Problem

In the film fitting device according to Patent Document 1 described above, the folding position of the individual cylindrical film cut and formed from the long cylindrical film base material folded into the sheet shape is generally located along the carrying direction of the containers sequentially carried to the film fitting position or located in a direction that intersects at right angles with the carrying direction. However, in the case of, for example, a container having a cornered horizontal section (hereinafter referred to as a cornered container), the film which is cylindrically opened and then fitted to the body of the container more easily lies along the outer circumferential surface of the container if the film folding position is aligned with the corner of the container, which makes it possible to inhibit the lateral displacement of the film relative to the circumferential direction of the container. Therefore, according to the technique used in conventional devices, the container is carried to the film fitting position while being rotated to a desired angular position by means of a screw which is used in a container carrier for sequentially carrying containers to the film fitting position, and the film folding position is thereby aligned with the corner of the container.

However, a problem remains in that the adjustment of the rotation of the container by means of such a screw is difficult and an accurate rotation angle of the container cannot be ensured.

The container rotated during carrying needs to be restored to the original angular position after film attachment. This is attributed to the following reasons: Container carrying operations including a transfer to a conveyer incorporated in the container carrier become unstable. The container needs to be restored to the original angular position for the sake of normal operation of an examining device for performing an image examination of the attachment of the film to the container. If the container that remains rotated as above enters a heater unit which thermally contracts the film fitted to the container into a final container attachment state, the heating condition created by heaters provided across a container carrying passage changes, whereby the thermal contraction of the film may affect a finish in the final attachment state.

Furthermore, there are various methods to restore the angle of the container; for example, the channel shape of the screw is changed, and a container carrying guide is added. However, each of the methods has drawbacks that lead to increased costs and lateral displacement of the film. In particular, the screw which can restore the angle of the container after the fitting of the film by rotating the container during carrying is expensive, and requires a number of exclusive components corresponding to the types of containers to be handled. Therefore, equipment costs for the container carrier are higher when there are more types of containers.

Accordingly, the present invention has been conceived in view of the problems mentioned above. An object of the invention is to provide a fitting device and a fitting method for a cylindrical film body wherein the fitting angular position of the cylindrical film body to be fitted to a fitting target at a fitting position relative to a container is adjustable.

Solution to Problem

A manufacturing device of a cylindrical film body according to the present invention is a fitting device of a cylindrical film body to cylindrically open and feed downward an individual film body which is formed by carrying a long cylindrical film base material folded into a sheet shape and then sequentially cutting the film base material to a predetermined length, and thereby fit the individual film body around a fitting target carried to a fitting position. The fitting device includes a feed unit which feeds downward the film base material while changing the carrying direction thereof, and a fitting unit which carries the film body downward and fits the film body to the fitting target, the film body being formed by cutting the film base material fed by the feed unit. The fitting unit is provided so as to be turnable relative to the fitting target so that the fitting angular position of the cylindrical film body relative to the circumferential direction of the fitting target is adjustable.

In the manufacturing device of the cylindrical film body according to the present invention, the feed unit may be provided so as to be turnable independently of the fitting unit, and may be adjustable to an angular position different from the angular position of the fitting unit relative to the circumferential direction of the fitting target.

In the manufacturing device of the cylindrical film body according to the present invention, the fitting unit may include, integrally turnably, a pitch-feed roller unit which intermittently feeds the film base material by a predetermined length, a cutting unit which cuts the film base material fed from the roller unit into an individual cylindrical film body, a mandrel which opens and guides the cut cylindrical film body downward, and a transfer unit which carries the cylindrical film body downward along the outer circumference of the mandrel.

According to another aspect of the present invention, there is provided a fitting method of a cylindrical film body to cylindrically open and feed downward an individual film body which is formed by carrying a long cylindrical film base material folded into a sheet shape and then sequentially cutting the film base material to a predetermined length, and thereby fit the individual film body around a fitting target carried to a fitting position. The fitting method includes the steps of feeding the film base material downward while changing the carrying direction thereof by a feed unit, sequentially cutting the fed film base material to a predetermined length by a cutting unit to form an individual film body, carrying the cylindrical film body downward by a transfer unit while opening the cylindrical film body by a mandrel, and discharging the opened cylindrical film body from the lower end of the mandrel by a shot unit to fit the cylindrical film body to the fitting target. The cutting unit, the mandrel, and the transfer unit are integrally turned to adjust the fitting angular position of the cylindrical film body relative to the circumferential direction of the fitting target.

Advantageous Effects of Invention

According to the fitting device of the cylindrical film body of the present invention, the fitting unit including, for example, the cutting unit is provided so as to be turnable relative to the fitting target to thereby enable adjustment of the fitting angular position of the cylindrical film relative to the circumferential direction of the fitting target carried to the fitting position. Therefore, any folding position of the cylindrical film body to be fitted to the fitting target can be set. Thus, the folding position of the cylindrical film body can be aligned with the corner of the cornered cross section of the fitting target without rotating the fitting target and changing its angle while the fitting target is being carried to the fitting position. As a result, it is possible to inhibit the lateral displacement of the cylindrical film body fitted to the fitting target relative to the circumferential direction.

DESCRIPTION OF EMBODIMENT

Hereinafter, an embodiment will be described with reference to the drawings. In this description, specific shapes, materials, numerical values, directions, and other parameters are shown as examples to facilitate the understanding of the present invention, and can be changed suitably to uses, purposes, and specifications. When a plurality of embodiments and modifications are included below, the use of suitable combinations their characteristic parts is assumed from the beginning.

Furthermore, although in the example described in the present embodiment a cylindrical film body is a label to be fitted to the body of a bottle container which is a fitting target, the cylindrical film body may be a cap seal to be fitted to a cap portion of the bottle container. Moreover, the fitting target to be fitted with the label which is the cylindrical film body is not limited to the container, and may be some other article having a columnar outer circumferential surface shape.

Figure 1:
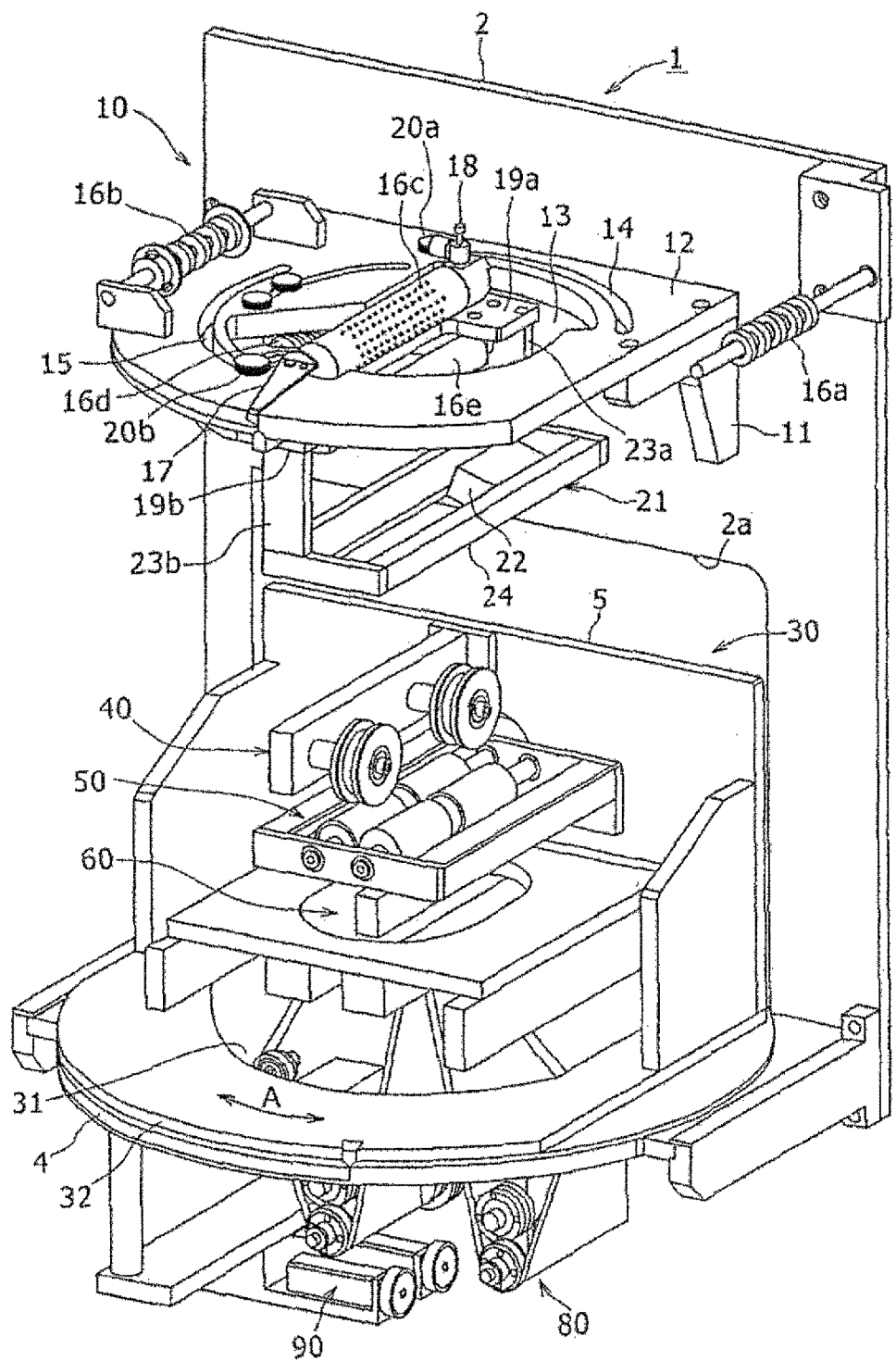
FIG. 1 is a perspective view showing the entirety of a label fitting device according to an embodiment (without an inner guide and a mandrel)
Figure 2:
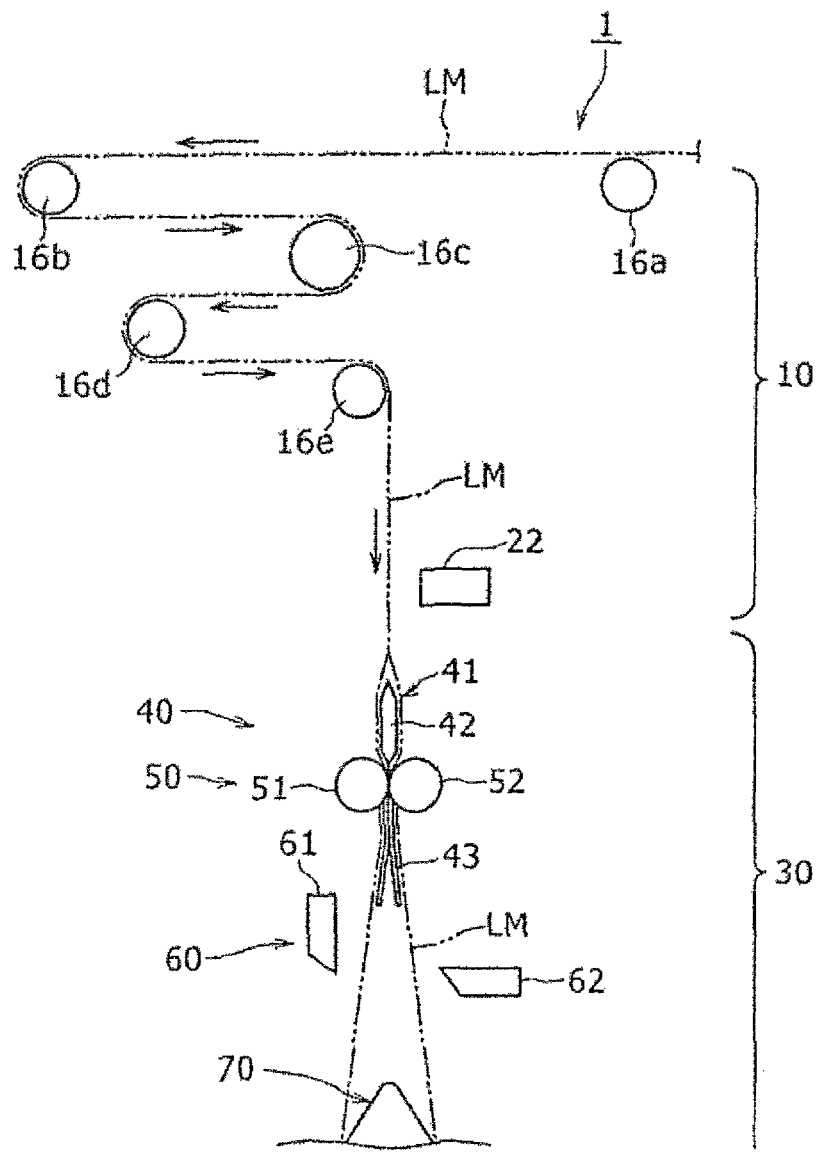
FIG. 2 is a front view showing a label base material feed unit constituting the upper part of the label fitting device in FIG. 1 together with part of a label fitting unit constituting the lower part of the label fitting device.

FIG. 1 is a perspective view showing a label fitting device (cylindrical film body fitting device) 1 according to an embodiment of the present invention. FIG. 2 is a front view showing a label base material feed unit 10 constituting the upper part of the label fitting device 1 together with part of a label fitting unit 30 constituting the lower part of the label fitting device 1.

As shown in FIG. 1, the label fitting device 1 has the label base material feed unit 10 in its upper part, and has the label fitting unit 30 in its lower part. The label base material feed unit 10 and the label fitting unit 30 are attached to a fixed support wall 2 of the label fitting device 1. The fixed support wall 2 is a support member fixedly erected along a vertical direction in the label fitting device 1.

The label base material feed unit 10 has the function of feeding downward, toward the label fitting unit 30, a label base material LM which is a long cylindrical film base material folded into a sheet shape while changing the carrying direction thereof. The label fitting unit 30 has the function of feeding downward an individual label which is formed by cutting the label base material LM fed by the label base material feed unit 10 by a predetermined length, and then fitting the individual label to the bottle container. Here, the label is, for example, a cylindrical film body formed by printing on a polyester resin, polystyrene resin, or polyolefin resin shrink film having a thickness of 15 to 60 μm, and the label base material LM is a fold of seamlessly connected labels in a sheet shape.

The label base material feed unit 10 includes a first base member 12 attached to the fixed support wall 2 via a bracket 11. The first base member 12 has a substantially circular ring shape through which a central hole 13 is formed. The first base member 12 is disposed in a posture along a horizontal direction. The first base member 12 has arc-shaped guide holes 14 and 15 located to diametrically face each other across the central hole 13.

As shown in FIG. 1 and FIG. 2, the label base material feed unit 10 also includes a plurality of rotatably provided support rollers 16. The support rollers 16 can change the direction of the label base material LM in its surface direction by feeding the continuously carried label base material LM in a twisted state by part of the circular cylindrical or circular columnar outer circumferential surface of the support roller 16 when the long belt-shaped cylindrical label base material LM let out of a label roll (not shown) attached to a cylindrical label base material supplier is fed to the label fitting unit 30 via the label base material feed unit 10.

In the example shown in the present embodiment, the label base material feed unit 10 includes five support rollers 16a to 16e. More specifically, the first support roller 16a located on the most upstream side with respect to the carrying direction of the label base material LM is rotatably supported on the fixed support wall 2, and the upper part of its outer circumferential surface contacts and rotationally supports the label base material LM.

The second support roller 16b located on the downstream side of the first support roller 16a with respect to the carrying direction of the label base material LM is rotatably supported on the first base member 12 via a bracket. The second support roller 16b is provided at the same height as and parallel to the first support roller 16a. Thus, the second support roller 16b is configured to substantially horizontally turn back the carrying direction of the label base material LM toward the third support roller 16c while supporting, by half the circumference of the outer circumferential surface, the label base material LM which has been supported and carried by the first support roller 16a.

The third support roller 16c located on the downstream side of the second support roller 16b with respect to the carrying direction of the label base material LM is provided in the central hole 13 of the first base member 12. An engagement claw 17 which engages with the arc-shaped edge of the first base member 12 and which is slidable in the circumferential direction thereof is attached to one end of the third support roller 16c. Meanwhile, the other end of the third support roller 16c is rotatably supported by an attachment member (not shown) which is provided to be engaged with and guided by the guide hole 14, so that the position of the other end of the third support roller 16c can be set to any position along the guide hole 14 by fastening a fixing screw member 18.

Thus, the axial core direction of the third support roller 16c is adjustable in an angular range of, for example, about 45 degrees within a horizontal surface inside the central hole 13. As shown in FIG. 2, the third support roller 16c is configured to substantially horizontally turn back the carrying direction of the label base material LM toward the fourth support roller 16d while supporting, by half the circumference of the outer circumferential surface, the label base material LM which has been supported and carried by the second support roller 16b. Moreover, a large number of small protrusions which prevent the label base material LM from easily slipping are formed on the outer circumferential surface of the third support roller 16c.

Respective ends of each of the fourth and fifth support rollers 16d and 16e, which are located on the downstream side of the third support roller 16c with respect to the carrying direction of the label base material LM, are rotatably supported by two brackets 19a and 19b. The fourth support roller 16d and the fifth support roller 16e are attached to the brackets 19a and 19b at positions located apart from each other and in a posture parallel to each other.

The fourth support roller 16d is configured to substantially horizontally turn back the carrying direction of the label base material LM toward the fifth support roller 16e while supporting, by half the circumference of the outer circumferential surface, the label base material LM which has been supported and carried by the third support roller 16c. The fifth support roller 16e is configured to feed vertically downward the carrying direction of the label base material LM toward the label fitting unit 30 while supporting, by a quarter circumference of the outer circumferential surface, the label base material LM which has been supported and carried by the fourth support roller 16d.

The brackets 19a and 19b which support the fourth and fifth support rollers 16d and 16e are attached to the guide holes 14 and 15 of the first base member 12 by fixing screw members 20a and 20b, respectively. Thus, when the fixing screw members 20a and 20b are loosened to move the brackets 19a and 19b along the guide holes 14 and 15, the fourth and fifth support rollers 16d and 16e can be rotated relative to the first base member 12 within an angular range of, for example, about 90 degrees. Since the fourth and fifth support rollers 16d and 16e are configured to be rotatable independently of the third support roller 16c, the axial core direction of each roller 16d, 16e can be adjusted and set to a direction different from that of the third support roller 16c when viewed from the top.

The label base material feed unit 10 further has a mark sensor unit 21 under the fifth support roller 16e. The mark sensor unit 21 includes an optical mark sensor 22 to detect a mark included in each label of the label base material LM. This mark sensor 22 is disposed to face the label base material LM which is carried vertically downward, by way of a sensor bracket 24 which is supported by support arms 23a and 23b suspended from the brackets 19a and 19b. The operation of each component of the later-described label fitting unit 30 is controlled on the basis of a mark detection signal output from the mark sensor 22.

Although in the above description the label base material feed unit 10 includes the five support rollers 16a to 16e, this is not a limitation, and suitable modifications can be made. For example, the fourth and fifth support rollers 16d and 16e may be omitted, and the label base material LM which has passed through the third support roller 16c may be directly guided vertically downward and sent to the label fitting unit 30.

Figure 3:
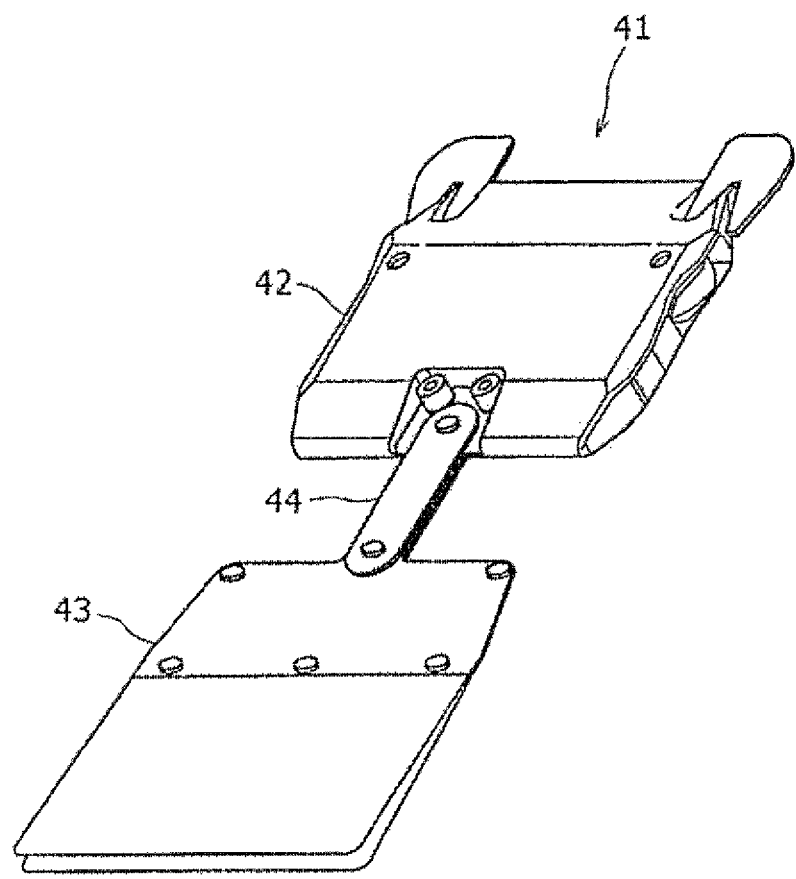
FIG. 3 is a perspective view of an inner guide included in the label fitting unit.
Figure 4:
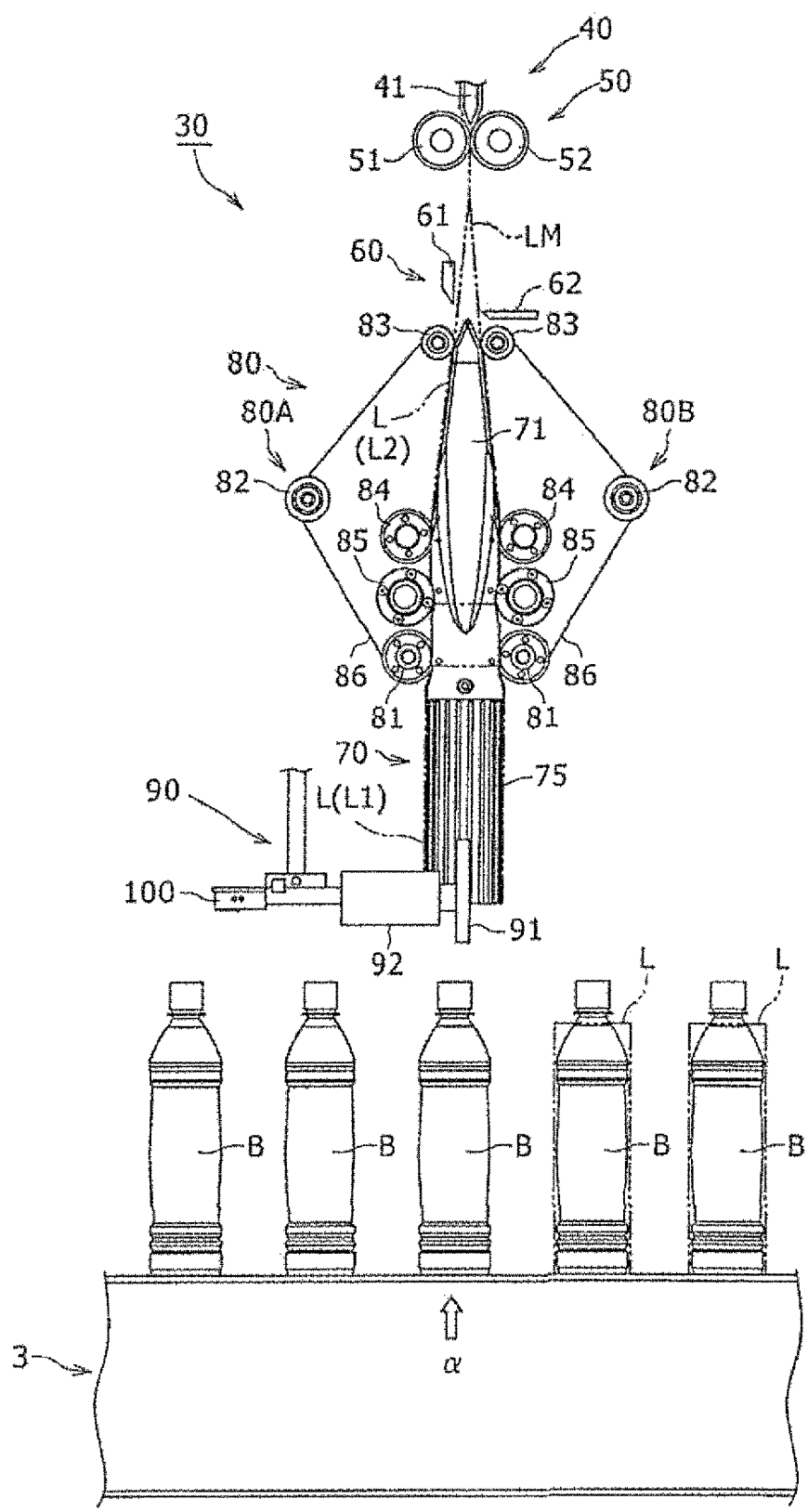
FIG. 4 is a front view showing the label fitting unit constituting the lower part of the label fitting device in FIG. 1.
Figure 5:
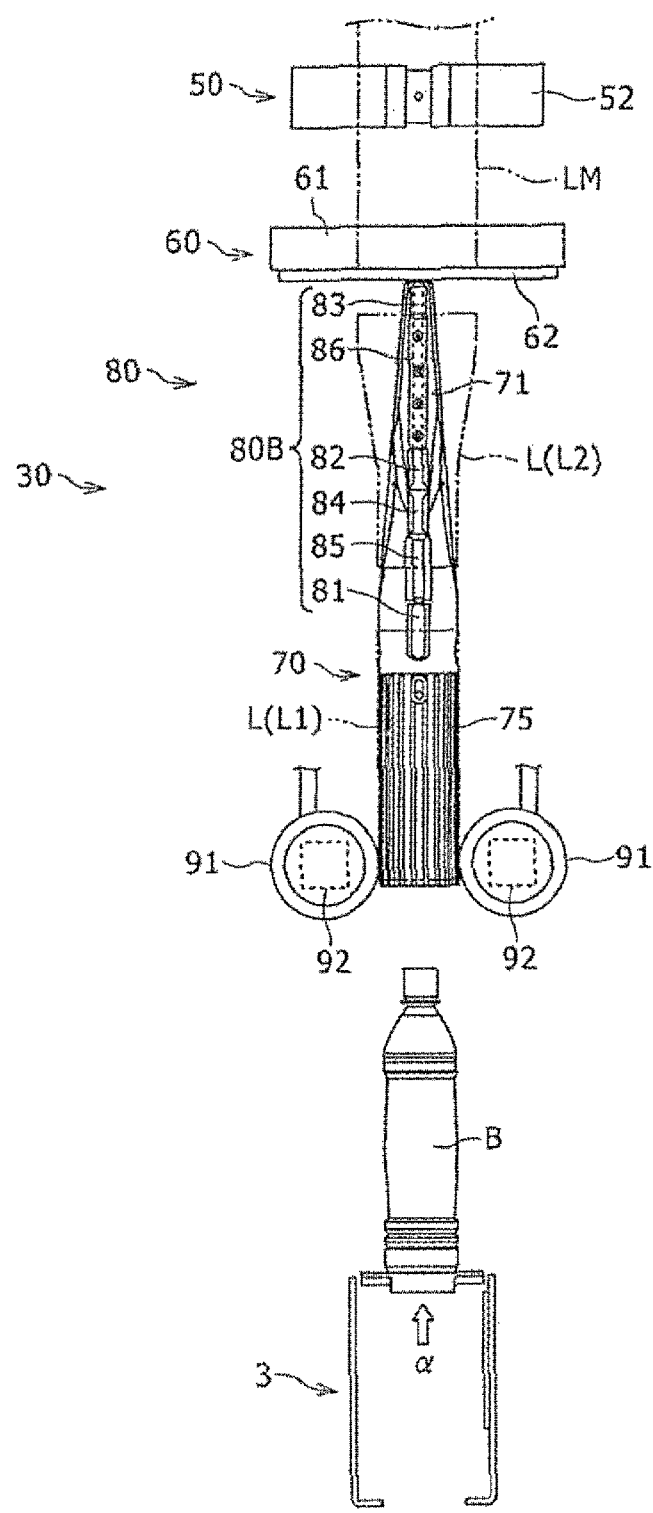
FIG. 5 is a side view of the label fitting unit in FIG. 4.

Now, the label fitting unit 30 is described with reference to FIG. 1 and FIG. 2 in addition to FIG. 3 to FIG. 5. FIG. 3 is a perspective view of an inner guide 41 included in the label fitting unit 30. FIG. 4 is a front view showing the label fitting unit 30 constituting the lower part of the label fitting device 1 in FIG. 1. FIG. 5 is a side view of the label fitting unit 30 in FIG. 4.

As shown in FIG. 4 and FIG. 5, the label fitting unit 30 cuts an individual label L from the label base material LM folded into a sheet shape in which cylindrical labels L are seamlessly connected, and at the same time, sequentially discharges the label L to a label fitting position α, thereby fitting the label L to the body of each of bottle containers B sequentially carried to the label folding position α at a predetermined carrying pitch by a bottle carrier 3.

The label fitting unit 30 has, in order from top to bottom, an inner guide unit 40, a pitch-feed roller unit 50, a cutting unit 60, a mandrel 70, a transfer unit 80, and a shot roller unit 90.

The inner guide unit 40 is provided under the mark sensor unit 21, and includes the inner guide 41 disposed inside the cylindrical label base material LM continuously carried in a connected state. As shown in FIG. 3, the inner guide 41 has a plate-shaped upper guide portion 42 having tapered upper and lower ends when viewed from the side, a lower guide portion 43 in which two thin plates are joined to expand downward substantially in a V-shape, and a strip-shaped coupling portion 44 which couples the upper guide portion 42 to the lower guide portion 43. As shown in FIG. 2, the inner guide 41 is held so that the coupling portion 44 is caught between a pair of rollers 51 and 52 constituting the pitch-feed roller unit 50 across the label base material LM. As shown in FIG. 1, the upper guide portion 42 of the inner guide 41 is supported by two rotatable support pulleys via the folding positions on both sides of the label base material LM.

The upper guide portion 42 of the inner guide 41 has the function of guiding the label base material LM into the pair of pitch-feed rollers 51 and 52 along the vertical direction while holding the inner guide 41 from falling down between the pair of pitch-feed rollers 51 and 52. The lower guide portion 43 of the inner guide 41 opens the lower end of the label base material LM cut by the later-described cutting unit 60 so that the lower end of the label base material LM is fitted to the upper end of the mandrel 70.

The pitch-feed roller unit 50 comprises the roller pair composed of the driving roller 51 and the driven roller 52 to intermittently feed the label base material LM toward a cutting position by a predetermined pitch. The driving roller 51 is rotationally driven by an unillustrated motor such as a servomotor or a stepping motor. The driving of this motor is intermittently controlled on the basis of the mark detection signal by the mark sensor 22 so that the label base material LM is fed downward from the space between the pair of rollers 51 and 52 of the pitch-feed roller unit 50 by a predetermined cut length.

The cutting unit 60 is a guillotine-type cutter composed of a fixed blade 61 and a movable blade 62 to sequentially cut the label base material LM fed downward from the pitch-feed roller unit 50 by the predetermined length to form the individual label L. The movable blade 62 is rotationally driven by an unillustrated motor such as a servomotor or a stepping motor, and is controlled on the basis of the mark detection signal by the mark sensor 22 so as to operate to cut the label L from the label base material LM while the operation of feeding the label base material LM by the pitch-feed roller unit 50 is temporarily stopped. The cutting unit 60 is not limited to the above-mentioned guillotine-type cutter composed of the fixed blade and the movable blade. For example, the cutting unit 60 may be a type in which two movable blades move close to and away from each other, or may be composed of a fixed blade and a rotary movable blade.

The mandrel 70 fits to the label base material LM fed from the pitch-feed roller unit 50 to open the label base material LM into a predetermined state, and also functions as a guide for carrying downward the label L cut from the label base material LM by the carrying action of the transfer unit 80.

As shown in FIG. 4 and FIG. 5, the mandrel 70 has a label opening portion 71 which is tapered and wedged on its upper end side, and a label shaping portion 75 having a circular section which is continuously provided under the label opening portion 71. The label base material LM fitted to the upper end of the label opening portion 71 is transferred to the lower side of the label opening portion 71 and thereby gradually opened. After the label base material LM is cut into the individual label L, the individual label L is fitted to the label shaping portion 75 and thereby shaped into a circular cylindrical form.

A pair of upper rollers, a pair of middle rollers, and a pair of lower rollers (all are not shown) are rotatably attached to the lower half of the label opening portion 71 of the mandrel 70 in this order from the top so that the circumferential surfaces of the rollers slightly project in the upstream side and downstream side sectional surfaces in the carrying direction of the bottle container B.

A large number of chases are axially formed in the outer circumferential surface of the label shaping portion 75 of the mandrel 70 to reduce the area of contact with the label L. A pair of rollers (not shown) which catch the label L between a pair of shot rollers 91 and the mandrel 70 are rotatably attached to the lower end of the label shaping portion 75 at positions that intersect at right angles with the carrying direction of the bottle container B so that the circumferential surfaces of the rollers slightly project from the label shaping portion 75.

As shown in FIG. 4, a label detection sensor 100 comprising a reflective photoelectric sensor is provided on the upstream side in the carrying direction of the bottle container B, and a reflecting mirror which reflects light emitted from the label detection sensor 100 is attached to the lower end of the label shaping portion 75 of the mandrel 70, so that the label L transferred to the lower end position of the mandrel 70 by the transfer unit 80 is detected.

Although not shown, a bottle detection sensor comprising a reflective photoelectric sensor and a reflecting mirror which reflects light emitted from the bottle detection sensor are provided on the upstream side in the carrying direction of the bottle container B in the vicinity of the label fitting position α on both sides across the carrying passage of the bottle container B, so that the bottle container B carried by the bottle carrier 3 is detected at a position immediately before the label fitting position α. On the basis of the detection by the bottle detection sensor, the shot roller unit 90 is driven by the timing of the arrival of the bottle container B at the label fitting position α to discharge the label L from the lower end of the mandrel 70. As a result, the label L is correctly fitted to the body of the bottle container B.

The transfer unit 80 is composed of feed belt units 80A and 80B that are respectively provided on the upstream side and downstream side of the mandrel 70 in the carrying direction of the bottle container B. The feed belt units 80A and 80B catch, between the label opening portion 71 and the feed belt units 80A and 80B, the label L cut from the label base material LM by the cutting unit 60 while the label L is fitted to the label opening portion 71 of the mandrel 70, and then transfer the label L to the label shaping portion 75. Each of the feed belt units 80A and 80B comprises a driving pulley 81, four driven pulleys 82, 83, 84, and 85, and a feed belt 86 put across the pulleys.

The driving pulley 81 and the driven pulleys 84 and 85 of each of the feed belt units 80A and 80B are respectively provided at positions corresponding to the lower rollers, the upper rollers, and the middle rollers of the label opening portion 71 of the mandrel 70, and catch the label L between the pulleys and the lower rollers, the upper rollers, and the middle rollers across the feed belt 86.

The driving pulley 81 and the driven pulleys 84 and 85 of each of the feed belt units 80A and 80B are rotatably supported by the same support member, and the driven pulley 85 enters a recess formed in the label opening portion 71 of the mandrel 70 and thereby supports the mandrel 70 via the middle roller.

The shot roller unit 90 has the pair of shot rollers 91. The shot rollers 91 are provided at diametrically opposite positions in the lower part of the label shaping portion 75 of the mandrel 70. Each of the shot rollers 91 is directly coupled to the rotation shaft of a shot roller motor 92 comprising a servomotor. In the present embodiment, the shot rollers 91 are provided to rotate along the axial direction of the mandrel 70. Thus, when the shot rollers 91 are rotated while the label L fitted to the mandrel 70 is caught between the shot rollers 91 and the mandrel 70, the label L is sent downward along the outer circumferential surface of the label shaping portion 75 of the mandrel 70.

Referring again to FIG. 1, a second base member 4 having a through-hole 31 formed in the center is attached to the lower part of the fixed support wall 2 in a posture along the horizontal direction. A turning board 32 having the substantially circular through-hole 31 in the center is turnably mounted on the second base member 4. A turning support wall 5 is substantially vertically erected on the edge of the turning board 32. Thus, the turning support wall 5 can turn on the second base member 4 together with the turning board 32. A rectangular cutout 2a is formed in the fixed support wall 2 to prevent the label fitting unit 30 from interfering with the turning support wall 5 when the label fitting unit 30 is turned.

The label fitting unit 30 integrally including the inner guide unit 40, the pitch-feed roller unit 50, the cutting unit 60, the mandrel 70, and the transfer unit 80 that have been mentioned above is supported by the turning support wall 5 on the lateral side, and is supported by the turning board 32 on the lower side.

Thus, the label fitting unit 30 can be turned by moving the turning board 32 relative to the second base member 4 in an angular range of, for example, about 90 degrees in the direction of arrow A. As a result, the fitting angular position; that is, the folding position of the label L discharged toward the bottle container B which has been brought to the label fitting position α by the shot roller unit 90, can be adjusted and set to any position with respect to the circumferential direction of the bottle container B.

Figure 6:
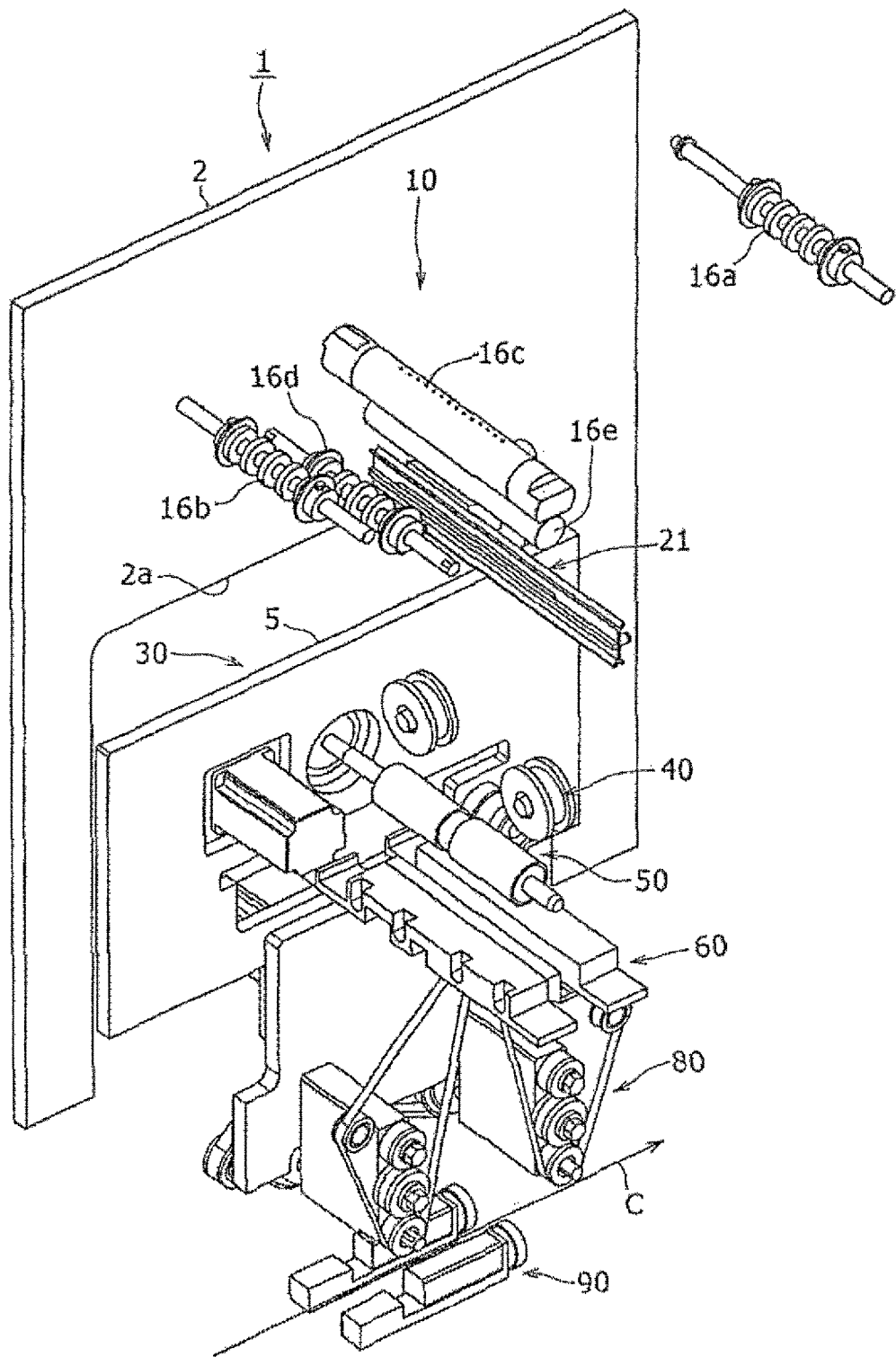
FIG. 6 is a partially omitted perspective view showing the label fitting device in which the angular positions of the label fitting unit and the label base material feed unit are adjusted to the same angular position.
Figure 7:
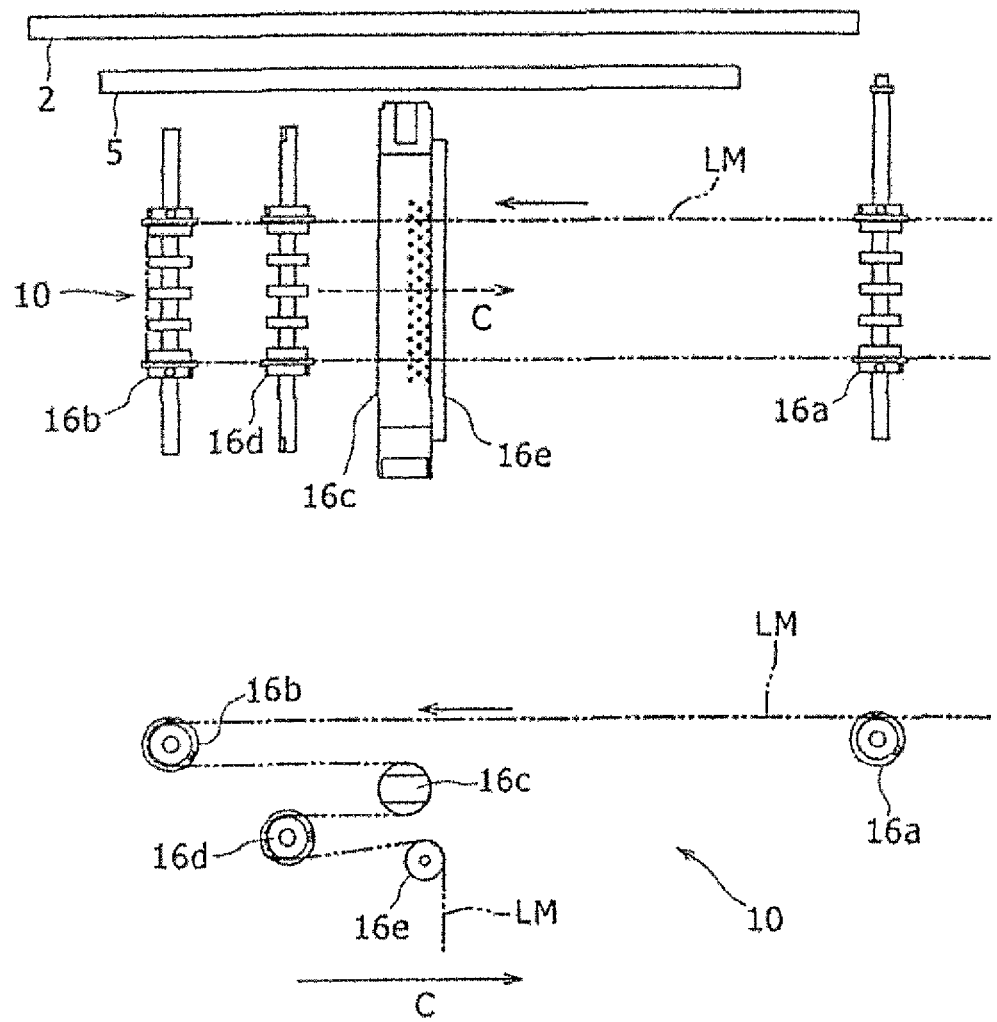
FIG. 7 shows a top view and a front view of the label fitting unit in FIG. 6.
Figure 8A:
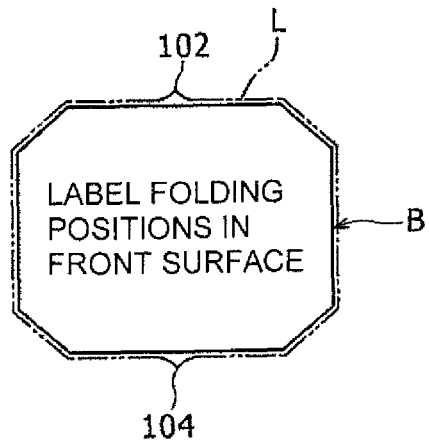
FIG. 8(a) is a sectional view showing an attachment state in which label folding positions are located on the flat front surface and rear surface of the body of a cornered container.
Figure 8B:
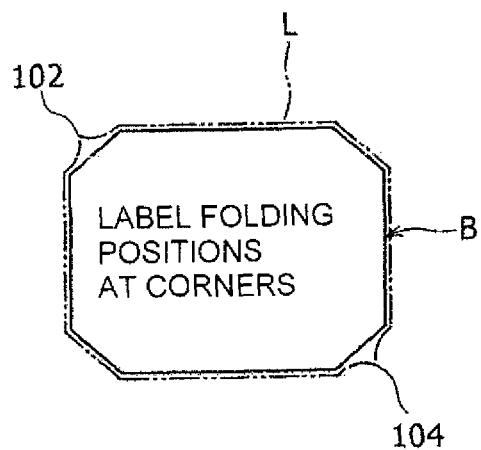
FIG. 8(b) is a sectional view showing an attachment state in which the label folding positions are located at the corners of the body of the cornered container.
Figure 9:
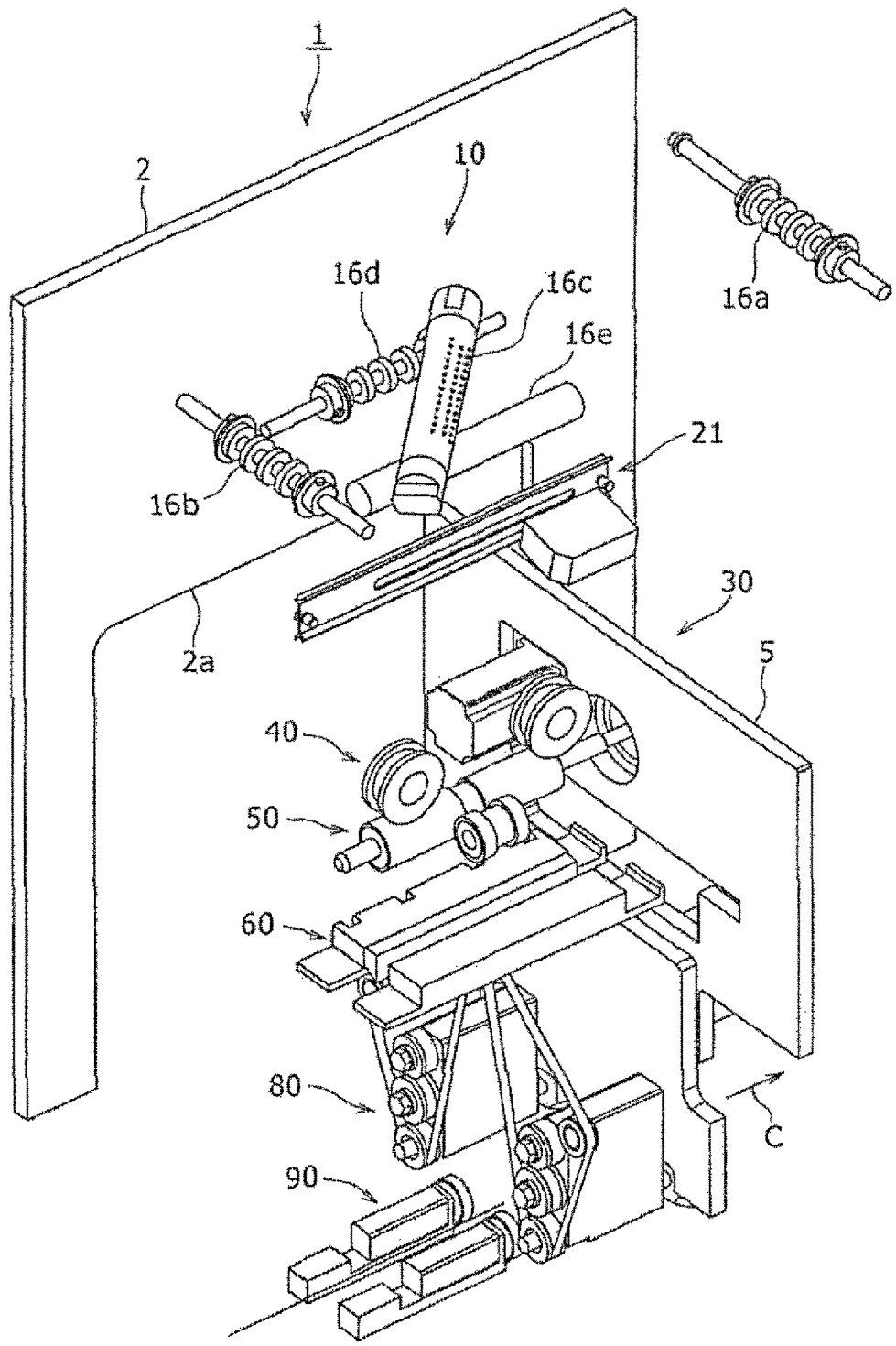
FIG. 9 is a partly omitted perspective view corresponding to FIG. 6 showing the label fitting device in which the angular positions of the label fitting unit and the label base material feed unit are adjusted to different angular positions.
Figure 10:
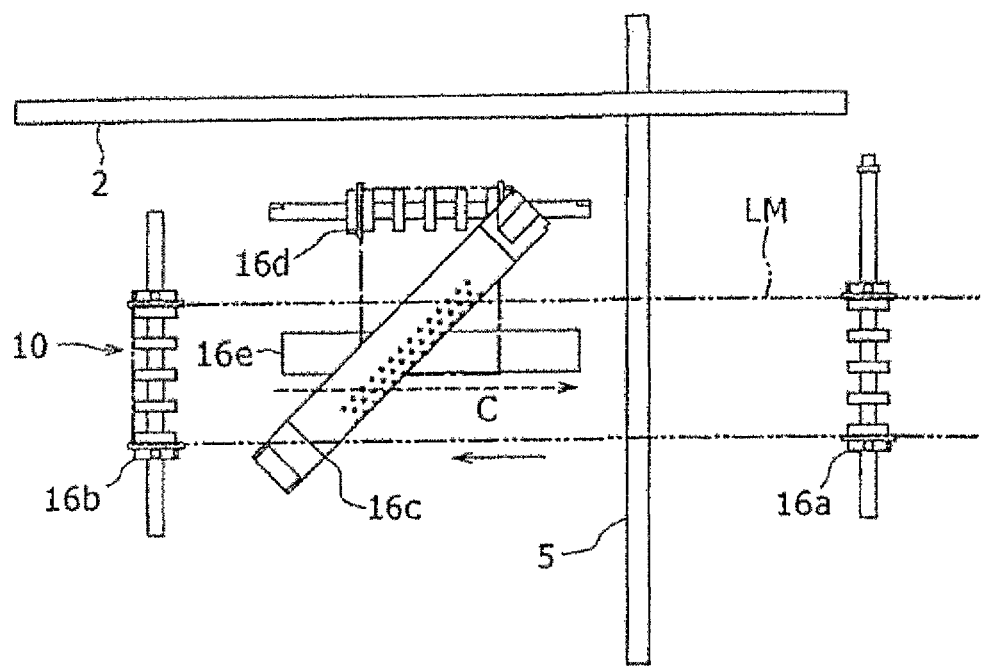
FIG. 10 shows a top view and a front view of the label base material feed unit in FIG. 9.
Figure 10:
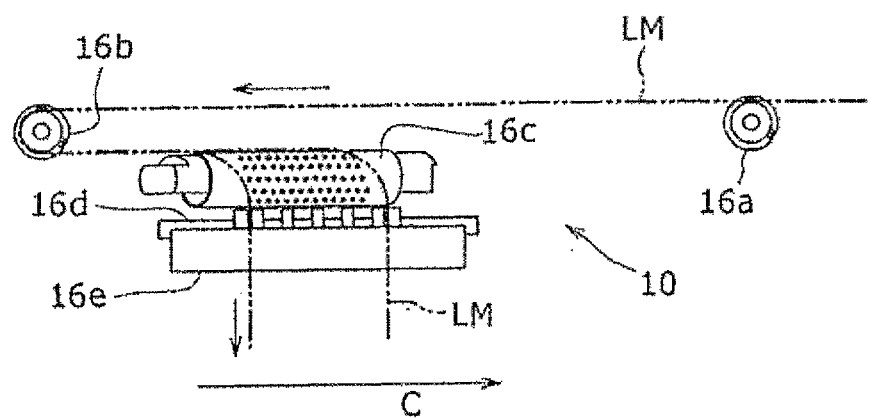

Further, the adjustment of the label fitting angular position in the label fitting device 1 including the label base material feed unit 10 and the label fitting unit 30 is described in detail with reference to FIG. 6 to FIG. 9. FIG. 6 is a partly omitted perspective view showing the label fitting device 1 in which the angular positions of the label fitting unit 30 and the label base material feed unit 10 are adjusted to the same angular position. FIG. 7 shows a top view and a front view of the label base material feed unit 10 in FIG. 6. FIG. 8(a) is a sectional view showing an attachment state in which label folding positions are located on the flat front surface and rear surface of the body of the cornered container. FIG. 8(b) is a sectional view showing an attachment state in which the label folding positions are located at the corners of the body of the cornered container. FIG. 9 is a partly omitted perspective view corresponding to FIG. 6 showing the label fitting device in which the angular positions of the label fitting unit 30 and the label base material feed unit 10 are adjusted to different angular positions. FIG. 10 shows a top view and a front view of the label base material feed unit 10 in FIG. 9.

As shown in FIG. 6 and FIG. 7, the fixed support wall 2 of the label fitting device 1 is disposed along the container carrying direction indicated by arrow direction C. Thus, each of the support rollers 16a to 16e constituting the label base material feed unit 10 is set so that the axial direction extends along the horizontal direction and intersects at right angles with the fixed support wall 2.

In this case, the label fitting unit 30 is set so that the turning support wall 5 which supports the label fitting unit 30 lies along the container carrying direction C in the same manner as the fixed support wall 2. Thus, the pitch-feed roller unit 50 and the cutting unit 60 included in the label fitting unit 30 are set so that the surface directions of the label base material LM and the label L that are carried through these units extend along the vertical direction and intersect at right angles with the fixed support wall 2.

When the label base material feed unit 10 and the label fitting unit 30 are set as above, the cylindrical label base material LM folded into a sheet shape is carried to the label base material feed unit 10 so that its surface direction extends along the horizontal direction and along the fixed support wall 2, as shown in FIG. 7. While being supported by the first to fifth support rollers 16a to 16e, the label base material LM is then fed downward toward the label fitting unit 30 so that its surface direction extends along the vertical downward direction and intersects at right angles with the fixed support wall 2 and the turning support wall 5. In this case, the surface directions of the label base material LM and the label L formed by cutting the label base material LM in the label fitting unit 30 intersect at right angles with the container carrying direction C.

When the label L is fitted to the cornered container B by the label fitting device 1 set as above, folding positions 102 and 104 of the label L in a final attachment state after thermal contraction may be located on the substantially flat front surface and rear surface of the bottle container B, as shown in FIG. 8(a). In this case, the label L which is substantially circularly cylindrically opened and relatively loosely fitted before thermal contraction is easily displaced laterally with respect to the circumferential direction of the container B. As a result, a brand name, for example, printed on the labels L varies among the containers B, which may lead to defective label attachment.

In contrast, if the label L is fitted so that the folding positions 102 and 104 of the label L are aligned with the corners of the bottle container B as shown in FIG. 8(b), the label L which is cylindrically opened and fitted to the body of the container easily lies along the outer circumferential surface including the flat sides of the container B. As a result, the above-mentioned label lateral displacement and defective label attachment can be inhibited. Therefore, in the label fitting device 1 according to the present embodiment, the label base material feed unit 10 and the label fitting unit 30 are turned so that the folding positions 102 and 104 of the label L are located at the corners of the container B when the label L is fitted to the container B. In the example shown in FIG. 8(b), the fitting angular position of the label L relative to the container B is rotated counterclockwise by about 50 degrees.

As shown in FIG. 9, in the label base material feed unit 10, the third support roller 16c is set at a position which is turned clockwise by about 45 degrees from the state shown in FIG. 6, and the fourth support roller 16d and the fifth support roller 16e are set at positions which are turned clockwise by about 90 degrees from the state shown in FIG. 6. In the label fitting unit 30, the inner guide unit 40, the pitch-feed roller unit 50, the cutting unit 60, and the transfer unit 80 set at positions which are integrally turned clockwise by about 90 degrees from the state shown in FIG. 6.

Thus, as shown in FIG. 10, the label base material LM, which has been carried so that the surface direction extends along the horizontal direction, contacts with and is supported by the third support roller 16c in a posture tilted by about 45 degrees relative to the label base material LM which has been turned back from the second support roller 16b. As a result, the label base material LM passes along the third support roller 16c so that its carrying direction is changed by about 90 degrees, and is then fed vertically downward through the fourth and fifth support rollers 16d and 16e in such a posture that the surface direction of the label base material extends along the fixed support wall 2.

Therefore, the label base material LM which has been fed from the label base material feed unit 10 as above is then sequentially cut by the cutting unit 60 after passing through the mark sensor unit 21, the inner guide unit 40, and the pitch-feed roller unit 50 that are set to the same direction as the fifth support roller 16e, and the individual label L is produced. The individual label L is then opened around the mandrel 70 and transferred downward by the transfer unit 80, and the individual label L is discharged by the shot roller unit 90 from the lower end of the mandrel 70 and then fitted around the body of the container B which has arrived at the label fitting position α. In this instance, the folding positions 102 and 104 of the label L are located at the fitting angular positions which are circumferentially displaced by about 90 degrees as compared to the state shown in FIG. 6.

Figure 11:
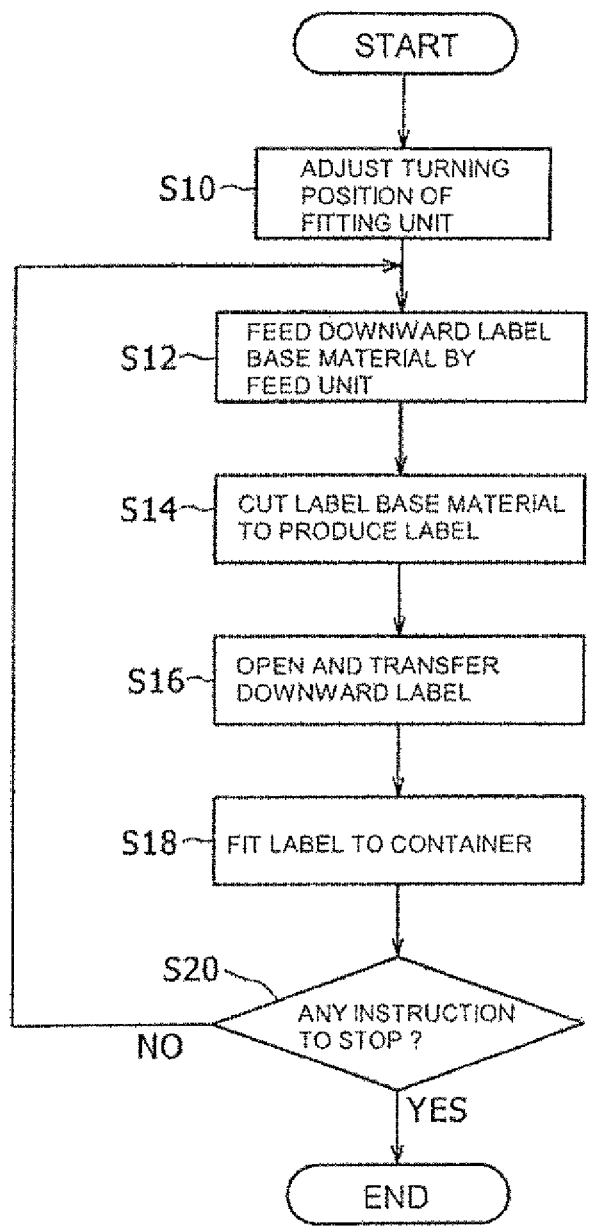
FIG. 11 is a flowchart showing a procedure of a label fitting method according to the embodiment.

Now, a label fitting method according to the present embodiment is described with reference to FIG. 11.

First, in step S10, the turning position of the label fitting unit 30 relative to the circumferential direction of the container B which has been carried to the label fitting position α is adjusted, and the fitting angular position of the label L relative to the container B is set. The fitting angular position may be manually set by an operator. Alternatively, an automatic adjusting mechanism which turns the turning board 32 by using, for example, a motor and a rack-and-pinion may be provided, and the fitting angular position may be automatically set in accordance with a value input by the operator via an operating panel.

In step S12, the label fitting device 1 then operates, and the label base material LM is fed downward from the label base material feed unit 10 toward the label fitting unit 30.

In step S14, the label base material LM fed downward from the pitch-feed roller unit 50 by a predetermined pitch is cut by the cutting unit 60, and the individual label L is formed.

In step S16, the label. L is then fitted to the mandrel 70 and thus opened and carried downward by the transfer unit 80.

In step S18, the cylindrically opened label L is then discharged from the lower end of the mandrel 70 by the shot roller unit 90, and fitted around the body of the bottle container B located at the label fitting position α.

The operation in steps S12 to S18 is continued until it is judged in step S20 that the operator, for example, has instructed to stop the device.

According to the label fitting device 1 in the present embodiment described above, the label fitting unit 30 including, for example, the cutting unit is provided so as to be turnable relative to the bottle container B to thereby enable adjustment of the fitting angular position of the label L relative to the circumferential direction of the bottle container B which has been carried to the label fitting position α. Therefore, the folding position of the cylindrical label to be fitted to the bottle container B can be set to any position. Thus, the folding position of the cylindrical label can be aligned with the corner of the bottle container B having a cornered cross section without rotating the bottle container B and changing its angle while the bottle container B is being carried to the label fitting position α. As a result, it is possible to inhibit the lateral displacement of the label fitted to the bottle container B relative to the circumferential direction.

According to the label fitting device 1 in the present embodiment, the third support roller 16c corresponding to feed direction changing means in the label base material feed unit 10 is rotatable independently of, for example, the pitch-feed roller unit 50 of the label fitting unit 30. Thus, if the third support roller 16c is set to an angular position different from that of the label fitting unit 30 having its rotational position set so that the folding position of the label L relative to the container carrying direction C will be a desired direction, it is possible to easily and smoothly transfer the label base material LM to the label fitting unit 30 while changing the surface direction of the label base material LM.

Furthermore, as described above, the folding position of the label L relative to the bottle container B can be set to any position by turning the label fitting unit 30 relative to the container carrying direction C. Thus, it is not necessary to carry the bottle container while changing its rotational position in the horizontal surface on the way to the label fitting position α. Therefore, no special screws or guides need to be used for the container carrier, the cost of the device can be considerably reduced, and the container can be stably carried.

The present invention is not limited to the embodiment described above and its modifications, and various modifications and improvements can be made within the scope of the matters described in the claims.

For example, in the embodiment described above, the mark sensor unit 21 is included in the label base material feed unit 10. However, the mark sensor unit 21 may be included in the label fitting unit 30 and turned together with, for example, the pitch-feed roller unit 50.

In the configuration described above, the shot roller unit 90 of the label fitting unit 30 is not turned relative to the container carrying direction C. However, the present invention is not limited to this configuration, and the shot roller unit 90 may be turned together with, for example, the transfer unit 80.

REFERENCE SIGNS LIST

1: label fitting device
2: fixed support wall
2a: cutout
3: bottle carrier
4: second base member
5: turning support wall
10: label base material feed unit
11, 19a, and 19b: brackets
12: first base member
13: central hole
14 and 15: guide holes
16a to 16e: first to fifth support rollers
17: engagement claw
18, 20a, and 20b fixing screw members
21: mark sensor unit
22: mark sensor
23a and 23b: support arms
24: sensor bracket 30: label fitting unit
31: through-hole
32: turning board
40: inner guide unit
41: inner guide
42: upper guide portion
43: lower guide portion
44: coupling portion
50: pitch-feed roller unit
51: driving roller
52: driven roller
60: cutting unit
61: fixed blade
62: movable blade
70: mandrel
71: label opening portion
75: label shaping portion
80: transfer unit
80A and 80B: feed belt units
81: driving pulley
82, 83, 84, and 85: driven pulleys
86: feed belt
90: shot roller unit
91: shot rollers
92: shot roller motor
100: label detection sensor
102 and 104: label folding positions
B: container
C: container carrying direction
L: label
LM: label base material
α: label fitting position

The invention claimed is:

1. A fitting device for cylindrically opening and feeding downward an individual film body that is formed by carrying a long cylindrical film base material folded into a sheet shape and then sequentially cutting the long cylindrical film base material to a predetermined length to provide the individual film body, and thereby fit the individual film body around a fitting target carried to a fitting position, the fitting device comprising:
 a feed unit configured to feed downward the long cylindrical film base material while changing the carrying direction thereof, and
 a fitting unit configured to carry downward the individual film body and fit the individual film body to the fitting target, the individual film body being formed by cutting the long cylindrical film base material fed by the feed unit, the fitting unit being horizontally turnable relative to the fitting target to thereby enable adjustment of a fitting angular position of the individual film body relative to a circumferential direction of the fitting target, the fitting unit including, integrally turnably:
  a pitch-feed roller unit configured to intermittently feed the long cylindrical film base material by a predetermined length,
  a cutting unit configured to cut the long cylindrical film base material fed from the roller unit into the individual film body,
  a mandrel configured to open and guide downward the cut individual film body, and
  a transfer unit configured to carry downward the individual film body along the outer circumference of the mandrel.

2. The fitting device of the individual film body according to claim 1, wherein
 the feed unit is provided so as to be turnable independently of the fitting unit, and is adjustable to an angular position different from an angular position of the fitting unit relative to the circumferential direction of the fitting target.

3. A fitting method of an individual film body to a fitting target to manufacture the fitting target to which the individual film body is fitted by the fitting device according to claim 1, the fitting method comprising the steps:
 adjusting the turning position of the fitting unit to set an angular position of the individual film body relative to the circumferential direction of the fitting target;
 feeding downward the long cylindrical film base material while changing the carrying direction thereof by the feed unit; and
 fitting the individual film body to the fitting target by the fitting unit, the individual film body being formed by cutting the long cylindrical film base material fed by the feed unit.

4. A fitting method of a individual film body to a fitting target to manufacture the fitting target to which the individual film body is fitted by the fitting device according to claim 1, the fitting method comprising:
 adjusting the fitting angular position of the individual film body relative to the circumferential direction of the fitting target by feeding the continuously carried long cylindrical film base material in a twisted state;
 feeding downward the long cylindrical film base material while changing the carrying direction thereof by the feed unit;
 sequentially cutting the fed long cylindrical film base material to a predetermined length by the cutting unit to form the individual film body;
 carrying downward the individual film body by the transfer unit while opening the individual film body by the mandrel; and
 discharging the opened individual film body from the lower end of the mandrel to fit the individual film body to the fitting target.

5. A fitting method for cylindrically opening and feeding downward an individual film body which is formed by carrying a long cylindrical film base material folded into a sheet shape and then sequentially cutting the long cylindrical film base material to a predetermined length, and thereby fit the individual film body around a fitting target carried to a fitting position to manufacture the fitting target to which the individual film body is fitted, the fitting method comprising the steps of:
 adjusting the fitting angular position of the individual film body relative to the circumferential direction of the fitting target by feeding the continuously carried long cylindrical film base material in a twisted state;
 feeding downward the long cylindrical film base material while changing the carrying direction thereof;
 sequentially cutting the fed long cylindrical film base material to a predetermined length to form the individual film body;
 carrying downward the individual film body by a fitting unit configured to be horizontally turnable relative to the fitting target while opening the individual film body by a mandrel; and
 discharging the opened individual film body from the lower end of the mandrel to fit the individual film body to the fitting target.

6. The fitting device of the individual film body according to claim 1, wherein
 the fitting target includes a corner, and the fitting unit is configured to rotatably turn to align a folding line of the individual film body with an axial direction of the corner.

7. The fitting method according to claim 5, wherein the fitting target includes a corner, and the fitting unit is configured to rotatably turn to align a folding line of the individual film body with an axial direction of the corner.

* * * * *